United States Patent Office 3,635,920
Patented Jan. 18, 1972

3,635,920
METAL PHOSPHINODITHIOATES AND BIS(PHOS-PHINOTHIOYL) DISULFIDES AS VULCANIZATION ACCELERATORS
David Apotheker, Wilmington, Del., assignor to E. I. du Pont de Nemours and Company, Wilmington, Del.
No Drawing. Filed May 21, 1969, Ser. No. 826,680
Int. Cl. C08f 27/06
U.S. Cl. 260—79.5 B    12 Claims

ABSTRACT OF THE DISCLOSURE

Vulcanization of copolymers of at least one α-olefin with a nonconjugated diene having no more than one polymerizable double bond is accelerated by metal phosphinodithioates of the formula

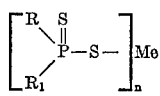

and by bis(phosphinothioyl) disulfides of the formula

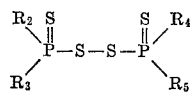

wherein each $R_1$, $R_2$, $R_3$, $R_4$, and $R_5$ can be phenyl, lower alkylphenyl, halophenyl, naphthyl, halonaphthyl, aralkyl and alkyl containing 1–20 carbon atoms, or cycloalkyl containing 5–6 ring carbon atoms; Me is zinc, copper, cadmium or iron; and $n$ is the valence of the metal. These vulcanization accelerators are particularly suitable for rapid, high-temperature cures because "reversion" of tensile properties, usually occurring at high temperatures, is here considerably reduced.

BACKGROUND OF THE INVENTION

This invention relates to new vulcanization accelerators for sulfur-curable addition copolymers of at least one α-olefin with a nonconjugated hydrocarbon diene having only one polymerizable double bond.

Elastomeric copolymers of α-olefins with nonconjugated dienes have become quite important in many applications, for example, in mechanical and automotive molded and extruded goods, hose, belts, and wire insulation. These copolymers have excellent tensile strength; aging, chemical and ozone resistance; and good processing safety of their stocks. It frequently is desirable to rapidly cure an elastomer at a high temperature, for example in an injection-molding machine.

Whereas vulcanization at temperatures lower than about 165° C. results in a cured elastomer which has its optimum tensile praperties, high temperature vulcanization often gives a product whose tensile properties reach their optimum values at some point during the process but gradually decrease as heating continues. This can be shown for instance by measuring the viscosity of an elastomeric polymer during vulcanization. When the viscosity reaches a maximum and decreases the tensile properties of the cured copolymer will be below their optimum value.

This phenomenon, known as "resersion," is especially significant in the case of thick pieces. There, outer portions cure first but deteriorate somewhat by the time inner portions are cured. It can be shown that reversion occurs when elastomeric copolymers of α-olefins with nonconjugated dienes are cured in the presence of most conventional vulcanization accelerators at high temperatures. There is a need, therefore, for a vulcanization accelerator which does not adversely affect the processing safety of α-olefin/nonconjugated diene copolymers and which does not cause a significant reversion of the cured product.

SUMMARY OF THE INVENTION

It has now been found that elastomeric copolymers of at least one α-olefin with a nonconjugated diene having no more than one readily polymerizable double bond can be cured by heating with sulfur at 140–250° C. in the presence of a divalent metal oxide and of a vulcanization accelerator which can be either a metal phosphinodithioate of the Formula I or a bis(phosphinothioyl)disulfide of the Formula II, below:

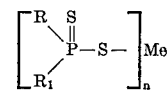    I

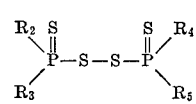    II where each $R_1$, $R_2$, $R_3$, $R_4$, and $R_5$ can be phenyl, lower alkylphenyl, halophenyl, naphthyl, halonaphthyl, aralkyl and alkyl radical containing 1–20 carbon atoms, or cycloalkyl radical containing 5–6 ring carbon atoms; Me can be zinc, copper, cadmium, or iron; and $n$ is the valence of the metal.

Small amount of vulcanization promoters, such as 2-mercaptobenzothiazole (or its salts with zinc, copper, iron or cadmium); or 2-benzothiazolyl disulfide, can also be present. Cured copolymers prepared by the process of the present invention have excellent tensile properties and do not show significant reversion even when curing is done at high temperatures in the range of 180–200° C.

DETAILED DESCRIPTION OF THE INVENTION

Elastomeric addition copolymers which are suitable for the purpose of the present invention can be for example dipolymers but preferably are tripolymers or tetrapolymers of at least one α-olefin with a nonconjugated diene which has only one readily polymerizable double bond. The α-olefins are preferably straight chain olefins of 1–18 carbon atoms. Representative olefins include ethylene, propylene, 1-butene, 1-pentene, 1-hexene, 1-decene, 1-dodecene, 1-hexadecene, and 1-octadcene.

The nonconjugated dienes can be either acyclic or cyclic. The acyclic dienes can be represented by Formula III:

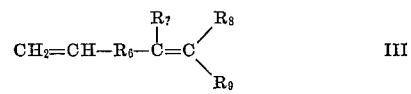    III where $R_6$ is an alkylene radical of 1–16 carbon atoms; $R_7$ and $R_8$ can each be independently hydrogen or an alkyl radical of 1–16 carbon atoms; and $R_9$ is an alkyl radical of 1–16 carbon atoms. An acyclic diene molecule has 6–22 carbon atoms. Representative acyclic dienes include, 1,4-hexadiene, 1,5 - heptadiene, 6-methyl-1,5-heptadiene, and 11-ethyl-1,11-tridecadiene. In these dienes the terminal, C-1, double bond is readily polymerizable.

Representative cyclic dienes which are suitable as comonomers for the preparation of vulcanizable copolymers useful in the process of the present invention are dicyclopentadiene, 5-ethylidene-2-norbornene, 5-methylene-2-norbornene, 2-alkyl-2,5-norbornadienes (such as 2-methyl- and 2-isopropyl-2,5-norbornadienes), and 1,4-cyclooctadiene.

Suitable commercially available copolymers are terpolymers of ethylene with propylene and a nonconjugated diene, such as 1,4-hexadiene, dicyclopentadiene, or 5-ethylidene-2-norbornene. Such elastomers are known in the trade as EPDM rubbers. These copolymers usually are made by contacting the monomers in the presence of a coordination catalyst, such as, for example, compounds of vanadium, titanium or chromium, together with an organoaluminum compound, such as an aluminum alkyl or an alkylaluminum halide. Often a catalyst promoter, such as benzotrichloride or carbon tetrachloride, also is present.

The vulcanization accelerators of the present invention are known compounds and can be made by a number of processes. Phosphinodithioic acids can be made for example by reaction of a Grignard reagent and phosphorus pentasulfide. Aromatic phosphinodithioic acids can also be made by a reaction of an aromatic hydrocarbon with phosphorus pentasulfide and anhydrous aluminum chloride [Higgins, Vogel and Craig, J. Am. Chem. Soc., 77, 1864 (1955). Disulfides of Formula II can be made by the oxidation of phosphinodithioic acids or mixtures of two different phosphinodithioic acids.

R and $R_1$ in Formula I and $R_2$, $R_3$, $R_4$, and $R_5$ in Formula II can include for example the following radicals: methyl, ethyl, propyl, isopropyl, butyl, secondary butyl, isobutyl, tertiary butyl, hexyl (all isomers), heptyl (all isomers) octyl (all isomers), hexadecyl (all isomers), cyclopentyl, methylcyclopentyl, ethylcyclopentyl, cyclohexyl, methylcyclohexyl, ethylcyclohexyl, propylcyclohexyl, benzyl, methylbenzyl, phenylethyl, phenylpropyl, methylphenyl, ethylphenyl, naphthyl, naphthylmethyl, naphthylethyl, fluorophenyl, chlorophenyl, bromophenyl, iodophenyl, fluoronaphthyl, chloronaphthyl and bromonaphthyl.

The vulcanization accelerator of the present invention is added to the elastomer stock in an amount of about 0.25–5 parts by weight per 100 parts by weight of elastomer. The preferred amount of the vulcanization accelerator is about 1–3 parts. Below the lower limits of vulcanization accelerator concentrations, the rate of cure may become so low that good elastomers cannot be obtained under normal operating conditions. Above the upper limit the operation becomes uneconomical because the rate of cure reaches a plateau, and further increase in the accelerator concentration does not improve either the cure rate or the properties of elastomer vulcanizates.

Elastomeric copolymers are vulcanized with sulfur, which is present in the amount of about 0.2 to 5 parts per 100 parts of elastomer. A divalent metal oxide also is present in the elastomer composition. Representative metal oxides are zinc oxide, cadmium oxide, magnesium oxide, calcium oxide, lead oxide and barium oxide. The preferred metal oxide is zinc oxide. The exact role of the metal oxide in the formulation is unknown, but it is believed to catalyze vulcanization by regenerating the accelerator from its complex with sulfur. The concentration of metal oxide is about 2–10 parts per 100 parts of elastomer, 3–5 parts being most practical. A small amount of a vulcanization promoter, for example 2-mercaptobenzothiazole or its derivatives, can also be present. Other ingredients which can be added to the formulation include antioxidants, processing aids or extenders (such as oils and plasticizers), pigments and fillers (for instance, carbon black, clay or titanium dioxide).

In operating this invention, sulfur, a metal oxide, vulcanization accelerator, and optionally a promoter, together with other conventional rubber-compounding ingredients, are incorporated in the usual manner of compounding rubber, as for example on a rubber mill or in a Banbury mixer. Compounded elastomers are vulcanized by heating at a temperature from about 140–250° C., the preferred range being 160–200° C. Conventional equipment, such as a press, a mold, an oven or an injection-molding apparatus, can be used. Usually, heating is continued for a period of about 5 minutes to one hour. The exact vulcanization conditions can of course be varied, adjusting both the temperature and the time so as to obtain best results.

The phenomenon of reversion can be studied by heating a compounded elastomer in a device which allows measurement of relative viscosity, such as the Monsanto Oscillating Disc Rheometer (ODR). The amount of torque required to oscillate the disc is a measure of viscosity. When no reversion is observed, the viscosity increases gradually until it reaches a maximum and remains nearly constant thereafter. Reversion is observed when viscosity decreases after a maximum has been reached.

The invention is illustrated by the following examples. All parts, percentages and proportions are by weight unless otherwise indicated.

The following elastomers are used in Examples 1–3: Elastomer A is a terpolymer of ethylene, propylene, and 1,4-hexadiene made in solution in the presence of a coordination catalyst prepared in situ by mixing vanadium tetrachloride with diisobutylaluminum chloride. The terpolymer has a Mooney viscosity at 121° C. (ML 1+4) of about 45. Elastomer A contains about 0.3 mole of ethylenic unsaturation per kilogram. A typical monomer unit composition (by weight) is: 63.4% ethylene, 33% propylene, and 3.6%, 1,4-hexadiene: Elastomer B is a terpolymer of ethylene, propylene, and 5-ethylidene-2-norbornene. It has a Mooney viscosity at 121° C. (ML 1+4) of about 54 and contains about 0.35 mole of ethylenic unsaturation per kilogram of elastomer: Elastomer C is a terpolymer of ethylene, propylene, and 1,4-hexadiene made in solution in the presence of a coordination catalyst prepared by mixing vanadium oxytrichloride and diisobutylaluminum chloride: Elastomer C has a Mooney viscosity at 121° C. (ML 1+4) of about 70. The typical monomer unit composition (by weight) is: 52.5% ethylene, 44% propylene, and 3.5% 1,4-hexadiene. The terpolymer has about 0.3 mole of ethylenic unsaturation per kilogram.

EXAMPLE 1

An elastomer is compounded on a two-roll rubber mill using the following compounding recipe:

| | Parts by weight |
|---|---|
| Elastomer | 100 |
| Sulfur | 2 |
| Zinc oxide | 5 |
| Stearic acid | 1 |
| Fast-extrusion furnace black | 120 |
| Naphthenic oil ("Circosol" 2XH, Sun Oil Co.) | 40 |
| 2-mercaptobenzothiazole | 1 |
| Vulcanization accelerator (see Table I, below) | 3 |

The compounded stock is heated in a Monsanto Oscillating Disc Rheometer (ODR) at 200° C. for 30 minutes. Curing curves are obtained in which the viscosities (torque in inch-pounds) are plotted against time in minutes. The torque increases as curing proceeds and reaches a maximum, but the measured torque decreases before the end of the test. The difference between the maximum torque and the final torque indicates the degree of reversion.

The processing safety of the compounded stock is determined by the Mooney Scorch test at 121° C. according to ASTM Method D 1646–61 using the small rotor. The higher the value the better is the processing safety. Two accelerators of this invention are compared with a prior art accelerator. The results are presented in Table I.

TABLE I

| Accelerator | Elastomer A | Elastomer B |
|---|---|---|
| Zinc ditolylphosphinodithioate (Formula I; R=R₁=tolyl; Me=Zn; n=2): | | |
| Maximum torque | 81 | 83 |
| Final torque (in.-lb.) | 76 | 76 |
| Points reversion | 5 | 7 |
| Mooney scorch, minutes to 10-point rise | 30 | 20 |
| Zinc diphenylphosphinodithioate (Formula I; R=R₁=phenyl; Me=Zn; n=2): | | |
| Maximum torque | 83 | 88 |
| Final torque (in.-lb.) | 77 | 83 |
| Points reversion | 6 | 5 |
| Mooney scorch, minutes to 10-point rise | >30 | 19 |
| Zinc dibutyldithiocarbamate (not within the scope of this invention): | | |
| Maximum torque | 77 | 79 |
| Final torque (in.-lb.) | 61 | 66 |
| Points reversion | 16 | 13 |
| Mooney scorch, minutes to 10-point rise | 10.5 | 9 |

The above results show that two accelerators of this invention cause considerably less reversion and have a much better processing safety than a prior art accelerator.

EXAMPLE 2

This test is carried out in the same way as Example 1 except that the following recipe is used:

|  | Parts |
|---|---|
| Elastomer | 100 |
| Sulfur | 1.5 |
| Zinc oxide | 5 |
| Zinc stearate | 1.5 |
| Fast-extrusion furnace black | 150 |
| Paraffinic oil ("Sunpar" 2280, Sun Oil Co.) | 35 |
| 2-mercaptobenzothiazole | 1 |
| Zinc diphenylphosphinodithioate | 3 |

In addition to the reversion and processing safety determination, as in Example 1, tensile properties of samples cured for 10 minutes at 193° C. are measured according to ASTM Method D 412-64 T. Table II shows the test results.

TABLE II

| Tensile properties | Elastomers A | Elastomers B |
|---|---|---|
| Modulus at 100% elongation, p.s.i. | 1,420 | 1,590 |
| Tensile strength at break, p.s.i. | 2,350 | 1,690 |
| Elongation at break, percent | 150 | 105 |
| Mooney Scorch, minutes to 10-point rise | (¹) | 17 |
| ODR: | | |
| Maximum torque | 104 | 91 |
| Final torque | 97 | 87 |
| Points reversion | 7 | 4 |

¹ No rise.

These data show that not only is reversion moderate and processing safety very good but also tensile properties of the vulcanized elastomers are excellent.

EXAMPLE 3

In this example the compounding recipe is as follows:

|  | Parts |
|---|---|
| Elastomer C | 100 |
| Sulfur | 2 |
| Zinc oxide | 5 |
| Ammonium stearate | 1 |
| Fast-extrusion furnace black | 100 |
| Medium thermal black | 60 |
| Naphthenic oil ("Circosol" 42XH, Sun Oil Co.) | 60 |
| Bis(ditolylphosphinothioyl) disulfide (Formula II; R₂=R₃=R₄=R₅=tolyl) | 3 |

Curing is carried out either for 10 minutes at 160° C. or for 5 minutes at 200° C. Table III shows the tensile properties of the vulcanized Elastomer C:

TABLE III

| Cure | 10 min. at 160° C. | 5 min. at 200° C. |
|---|---|---|
| Modulus at 300% elongation, p.s.i. | 950 | 1,570 |
| Tensile strength at break, p.s.i. | 1,675 | 1,940 |
| Elongation at break, percent | 640 | 420 |

These results show that Elastomer C can be rapidly cured in the presence of a vulcanization accelerator of this invention at the high temperature of 200° C. to a vulcanized product of excellent tensile properties.

I claim:

1. A vulcanizable composition consisting essentially of 100 parts by weight of an addition copolymer of at least one α-olefin of 1–18 carbon atoms with a nonconjugated diene having no more than one readily polymerizable double bond, about 0.2–5 parts of sulfur, 2–10 parts of a divalent metal oxide, and 0.25–5 parts of a vulcanization accelerator from the group (a) metal phosphinodithioates of the formula

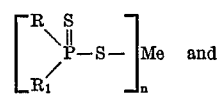

$$\left[\begin{array}{c}R\\ \diagdown\\ \diagup\\ R_1\end{array}\overset{S}{\overset{\|}{P}}-S-\right]_n Me \quad \text{and}$$

(b) bis(phosphinothioyl) disulfides of the formula

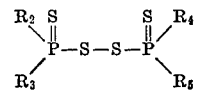

$$\begin{array}{c}R_2\\ \diagdown\\ \diagup\\ R_3\end{array}\overset{S}{\overset{\|}{P}}-S-S-\overset{S}{\overset{\|}{P}}\begin{array}{c}R_4\\ \diagup\\ \diagdown\\ R_5\end{array}$$

where each R, R₁, R₂, R₃, R₄ and R₅ is independently selected from the radicals phenyl, lower alkylphenyl, halophenyl, naphthyl, halonaphthyl, aralkyl and alkyl of 1–20 carbon atoms, and cycloalkyl of 5–6 ring carbon atoms; Me is a metal from the group zinc, copper, cadmium or iron; and n is the valence of the metal.

2. A composition of claim 1, in which the copolymer is a terpolymer of ethylene with propylene and 1,4-hexadiene.

3. A composition of claim 1 in which the copolymer is a terpolymer of ethylene with propylene and 5-ethylidene-2-norbornene.

4. A composition of claim 2 in which the vulcanization accelerator is zinc ditolyphosphinodithioate.

5. A composition of claim 2 in which the vulcanization accelerator is zinc diphenylphosphinodithioate.

6. A composition of claim 2 in which the vulcanization accelerator is bis(ditolylphosphinothioyl) disulfide.

7. A composition of claim 3 in which the vulcanization accelerator is zinc ditolylphosphinodithioate.

8. A composition of claim 3 in which the vulcanization accelerator is zinc diphenylphosphinodithioate.

9. In the process of vulcanizing by heating with sulfur at about 140–250° C. an addition copolymer of at least one α-olefin with a nonconjugated diene having no more than one readily polymerizable double bond in the presence of a divalent metal oxide, the improvement of using as a vulcanization accelerator a compound selected from the group:

(a) a metal phosphinodithioate of the formula

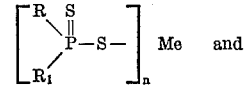

$$\left[\begin{array}{c}R\\ \diagdown\\ \diagup\\ R_1\end{array}\overset{S}{\overset{\|}{P}}-S-\right]_n Me \quad \text{and}$$

(b) a bis(phosphinothioyl) disulfide of the formula

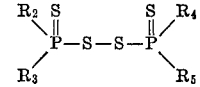

$$\begin{array}{c}R_2\\ \diagdown\\ \diagup\\ R_3\end{array}\overset{S}{\overset{\|}{P}}-S-S-\overset{S}{\overset{\|}{P}}\begin{array}{c}R_4\\ \diagup\\ \diagdown\\ R_5\end{array}$$

where each of R, R₁, R₂, R₃, R₄ and R₅ is independently selected from the radicals: phenyl, lower alkylphenyl, halophenyl, naphthyl, halonaphthyl, aralkyl and alkyl of 1-20 carbon atoms, and cycloalkyl of 5-6 ring carbon atoms; Me is a metal from the group zinc, copper, cadmium, or iron; and $n$ is the valence of the metal.

10. The process of claim 9 where the vulcanization temperature is 160-200° C.

11. The process of claim 9 where the addition copolymer is a terpolymer of ethylene with propylene and 1,4-hexadiene.

12. The process of claim 9, where the addition copolymer is a terpolymer of ethylene with propylene and with 5-ethylidene-2-norbornene.

References Cited

UNITED STATES PATENTS

| | | | |
|---|---|---|---|
| 2,954,379 | 9/1960 | Hook | 260—247.1 |
| 3,419,521 | 12/1968 | Scott | 260—41.5 |
| 3,400,106 | 9/1968 | Morita | 260—79.5 |
| 3,494,900 | 2/1970 | Morita | 260—79.5 |

JOSEPH L. SCHOFER, Primary Examiner

C. A. HENDERSON, Jr., Assistant Examiner

U.S. Cl. X.R.

260—783, 785